United States Patent
Neuneier et al.

(10) Patent No.: US 7,047,224 B1
(45) Date of Patent: May 16, 2006

(54) METHOD AND CONFIGURATION FOR DETERMINING A SEQUENCE OF ACTIONS FOR A SYSTEM WHICH COMPRISES STATUSES, WHEREBY A STATUS TRANSITION ENSUES BETWEEN TWO STATUSES AS A RESULT OF AN ACTION

(75) Inventors: Ralf Neuneier, München (DE); Oliver Mihatsch, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/787,698

(22) PCT Filed: Sep. 8, 1999

(86) PCT No.: PCT/DE99/02846

§ 371 (c)(1),
(2), (4) Date: Mar. 21, 2001

(87) PCT Pub. No.: WO00/17811

PCT Pub. Date: Mar. 30, 2000

(30) Foreign Application Priority Data

Sep. 23, 1998 (DE) ................................ 198 43 620

(51) Int. Cl.
*G06F 15/18* (2006.01)
(52) U.S. Cl. ...................................................... 706/12
(58) Field of Classification Search ................. 706/12; 434/323–433; 704/200–278
See application file for complete search history.

(56) References Cited

U.S. PATENT DOCUMENTS 5,608,843 A    3/1997 Baird, III ..................... 706/25
6,169,981 B1 *  1/2001 Werbos ........................ 706/23
6,336,109 B1 *  1/2002 Howard ........................ 706/25
6,581,048 B1 *  6/2003 Werbos ........................ 706/23

OTHER PUBLICATIONS

Neuneier, R., et al.; "Enhancing Q-Learning for Optimal Asset Allocation"; Advances in Neural Information Processing Systems 10-Proceedings of the 1997 conference; 1997; pp. 936-942.
Gutjahr, W.J.; "Failure Risk Estimation via Markov Software Usage Models"; Proceedings of the 15$^{th}$ International Conference on Computer Safety, Reliability and Security, SAFECOMP; 1996; Oct. 23-25, 1996; pp. 183-192.
Aoki, Y.; "Evaluation and Optimization of Environment Planning Under the Risk-Aversion of Non-Repairable Damage"; Environmental Systems Planning Conference; Aug. 1-5, 1977; pp. 847-852.
Sutton, R.S.; "Learning to Predict by the Methods of Temporal Differences"; Machine Learning 3; 1998; pp. 9-43.
Heger, M.; "Risk and Reinforcement Learning: Concepts and Dynamic Programming"; Zentrum für Kognitionswissenschaften, Universität of Bremen; 1995.
Bertsekas, D.P.; Dynamic Programming and Optimal Control; Chapter 5; 1995.

* cited by examiner

*Primary Examiner*—Anthony Knight
*Assistant Examiner*—Michael B. Holmes
(74) *Attorney, Agent, or Firm*—Staas & Halsey LLP

(57) ABSTRACT

A determination of a sequence of actions is performed such that a sequence of states resulting from the sequence of actions is optimized using a prescribed optimization function. The optimization function includes a variable parameter with which it is possible to establish a risk relating to the resulting sequence of states based upon a prescribed state of the system.

21 Claims, 4 Drawing Sheets

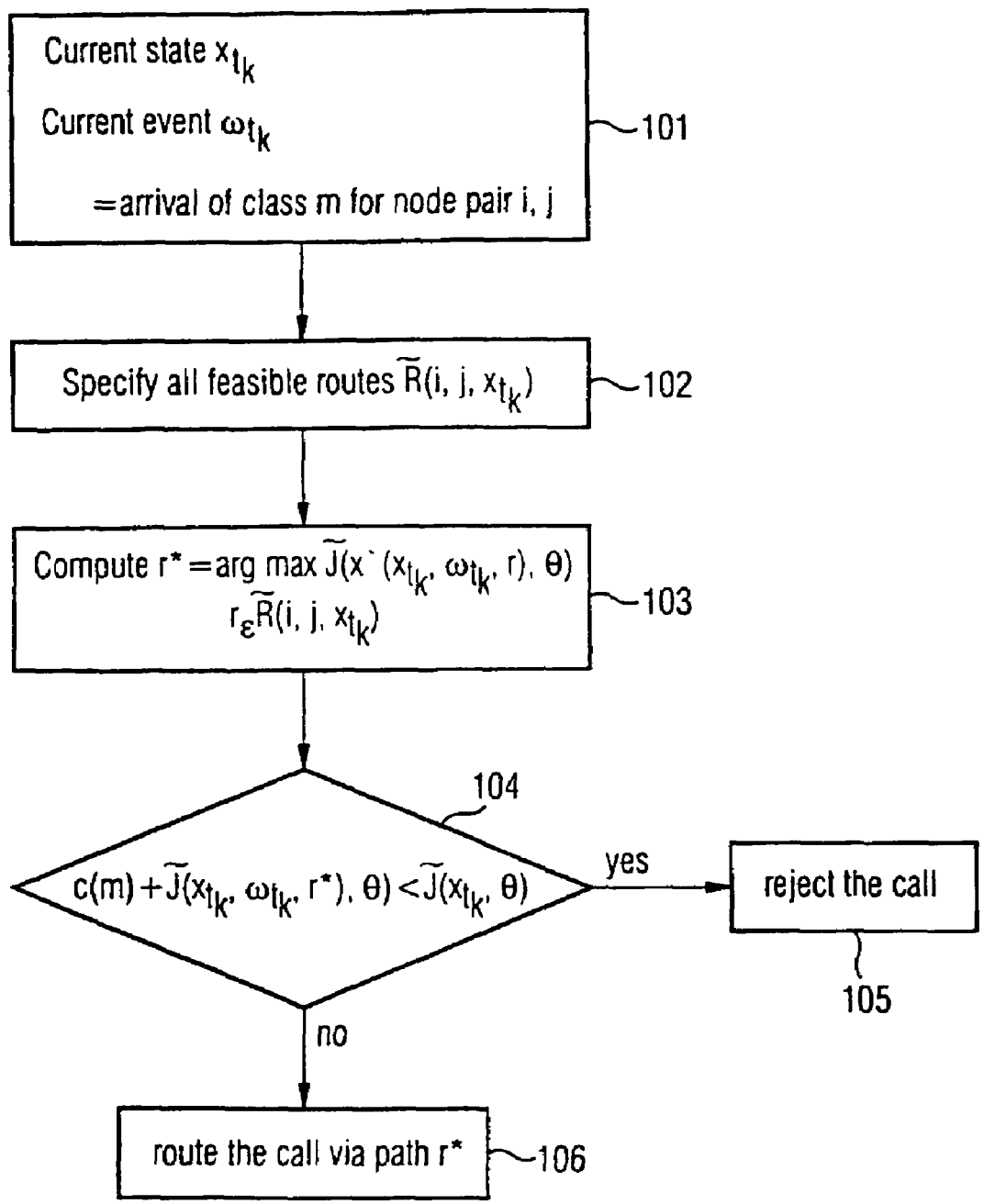

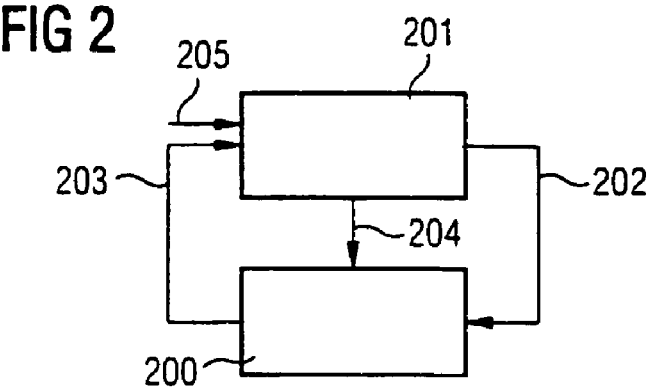
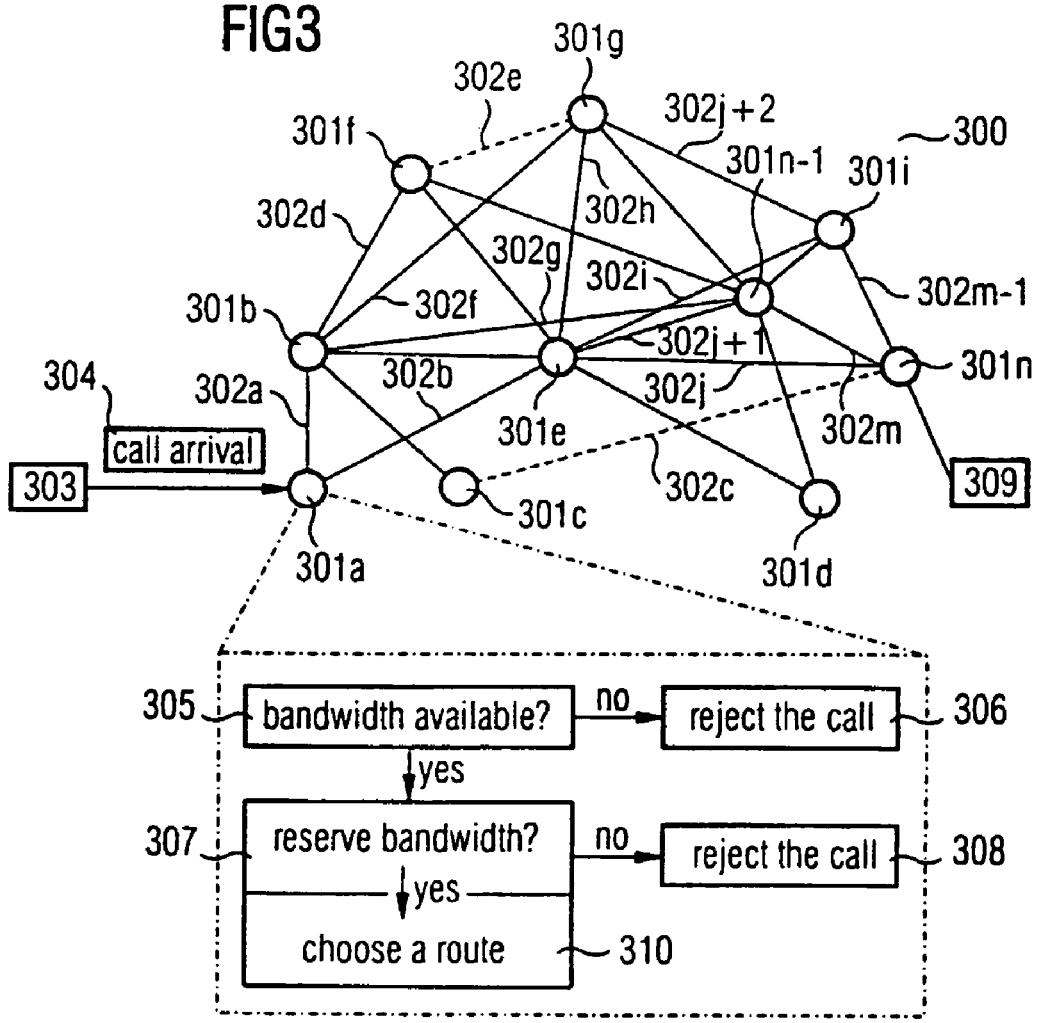

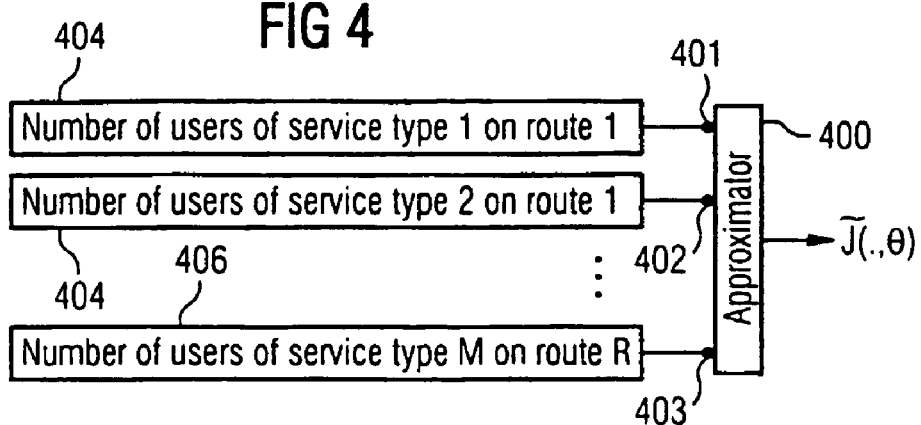
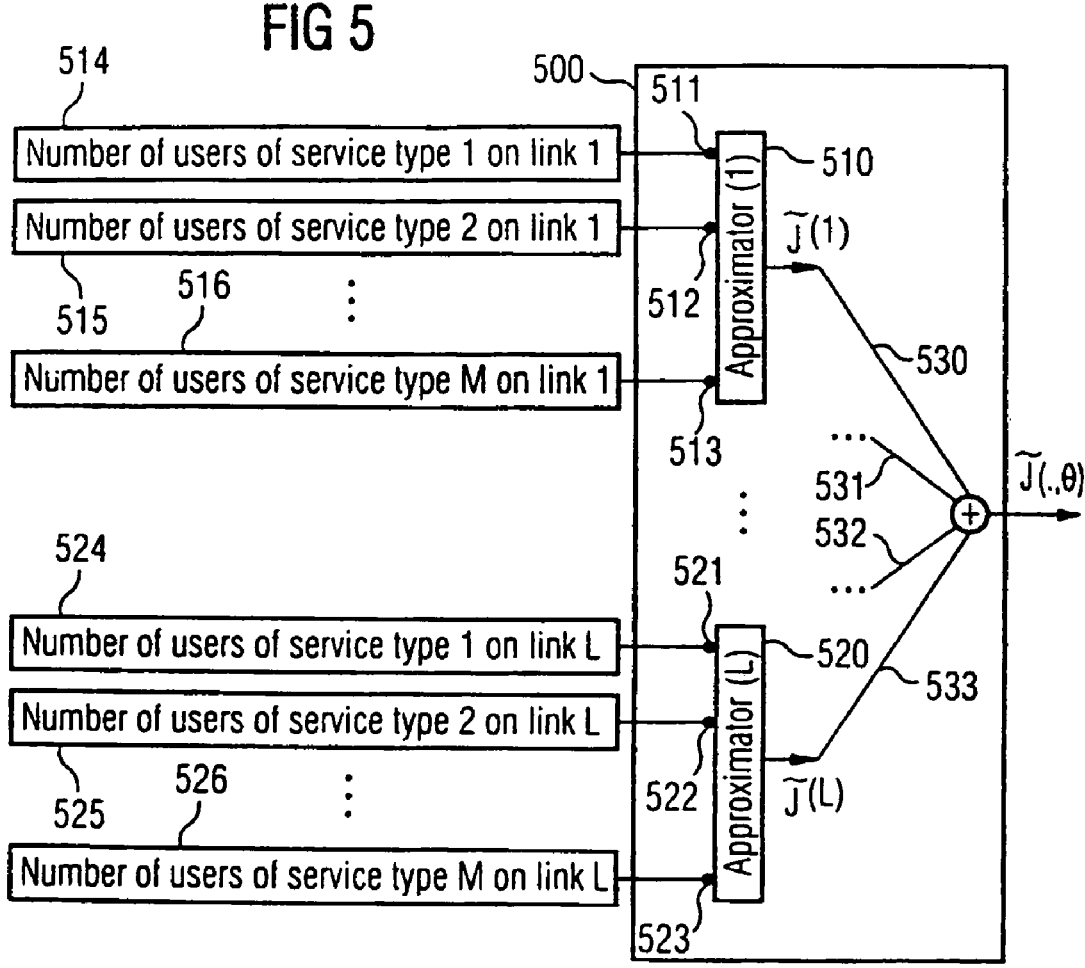

METHOD AND CONFIGURATION FOR DETERMINING A SEQUENCE OF ACTIONS FOR A SYSTEM WHICH COMPRISES STATUSES, WHEREBY A STATUS TRANSITION ENSUES BETWEEN TWO STATUSES AS A RESULT OF AN ACTION

BACKGROUND OF THE INVENTION

1. Field of the Invention

This invention generally pertains to systems having states, and in particular to methods for determining a sequence of actions for such systems.

2. Discussion of the Related Art

A generalized method and arrangement for determining a sequence of actions for a system having states, wherein a transition in state between two states is performed on the basis of an action, is discussed by Neuneier in "Enhancing Q-Learning for Optimal Asset Allocation", appearing in the Proceedings of the Neural Information Processing Systems, NIPS 1997. Neuneier describes a financial market as an example of a system which has states. His system is described as a Markov Decision Problem (MDP).

The characteristics of a Markov Decision Problem are represented below by way of summary:

X set of possible states of the system, e.g. $X = \Re^m$, $A(x_t)$ set of possible actions in the state $p(x_{t+1}|x_t, a_t)$ $x_t$ $r(x_t, a_t, x_{t+1})$ gain with expectation $R(x_t, a_t)$.

Starting from observable variables, the variables denoted below as training data, the aim is to determine a strategy, that is to say a sequence of functions $$\pi = \{\mu_0, \mu_1, K, \mu_T\}, \quad (3)$$

which at each instant t map each state into an action rule, that is to say action $$\mu_t(x_t) = a_t \quad (4)$$

Such a strategy is evaluated by an optimization function.

The optimization function specifies the expectation, the gains accumulated over time at a given strategy $\pi$, and a start state $x_0$.

The so-called Q-learning method is described by Neuneier as an example of a method of approximative dynamic programming.

An optimum evaluation function $V^*(x)$ is defined by $$V^*(x) = \max_\pi V^\pi(x) \forall x \in X \quad (5)$$

where $$V^\pi(x) = E\left[\sum_{t=0}^{\infty} \gamma^t r(x_t, \mu_t, x_t + 1) | x_0 = x\right], \quad (6)$$

$\gamma$ denoting a prescribable reduction factor which is formed in accordance with the following rule:

$$\gamma = \frac{1}{1+z}, \quad (7)$$

$$z \in \rho^+. \quad (8)$$

A Q-evaluation function $Q^*(x_t, a_t)$ is formed within the Q-learning method for each pair (state $x_t$, action $a_t$) in accordance with the following rule:

$$Q^*(x_t, a_t) := \sum_{x \in X} p(x_{t+1}|x_t, a_t) \cdot r_t + \quad (9)$$
$$+ \gamma \cdot \sum_{x \in X} p(x|x_t, a_t) \cdot \max_{a \in A}(Q^*(x, a))$$

On the basis respectively of the tupel $(x_t, x_{t+1}, a_t, r_t)$, the Q-values $Q^*(x,a)$ are adapted in the k+1 th iteration in accordance with the following learning rule with a prescribed learning rate $\eta_k$ in accordance with the following rule:

$$Q_{k+1}(x_t, a_t) = \quad (10)$$
$$(1-\eta_k)Q_k(x_t, a_t) + \eta_k\left(r_t + \gamma \max_{a \in A}(Q_k(x_{t+1}, a))\right).$$

Usually, the so-called Q-values $Q^*(x,a)$ are approximated for various actions by a function approximator in each case, for example a neural network or a polynomial classifier, with a weighting vector $w^a$, which contains weights of the function approximator.

A function approximator is, for example, a neural network, a polynomial classifier or a combination of a neural network with a polynomial classifier.

It therefore holds that:

$$Q^*(x, a) \approx Q(x; w^a). \quad (11)$$

Changes in the weights in the weighting vector $w^a$ are based on a temporal difference $d_t$ which is formed in accordance with the following rule:

$$d_t := r(x_t, a_t, x_{t+1}) + \gamma \max_{a \in A} Q(x_{t+1}; w_k^a) - Q(x_t; w_k^{a_t}) \quad (12)$$

The following adaptation rule for the weights of the neural network, which are included in the weighting vector $w^a$, follows for the Q-learning method with the use of a neural network:

$$w_{k+1}^{a_t} = w_k^{a_t} + \eta_k \cdot d_t \cdot \nabla Q(x_t; w_k^{a_t}). \quad (13)$$

The neural network representing the system of a financial market as described by Neuneier is trained using the training data which describe information on changes in prices on a financial market as time series values.

A further method of approximative dynamic programming is the so-called TD($\lambda$) learning method. This method is discussed in R.S. Sutton's, "Learning To Predict By The Method Of Temporal Differences", appearing in Machine Learning, Chapter 3, pages 9–44, 1988.

Furthermore, it is known from M. Heger's, "Risk and Reinforcement Learning: Concepts and Dynamic Programming", ZKW Bericht No. Aug. 1994, Zentrum für Kognitionswissenschaften [Center for Cognitive Sciences], Bremen University, December 1994, that risk is associated with a strategy $\pi$ and an initial state $x_t$. A method for risk avoidance is also discussed by Hager, cited above.

The following optimization function, which is also referred to as an expanded Q-function $Q^\pi(x_t, a_t)$, is used in the Heger method:

$$Q^\pi(x_t, a_t) := \left( r(x_t, a_t, x_{t+1}) + \inf_{\substack{x_0, x_1, K \\ p(x_0, x_1, K) > 0}} \left\{ \sum_{k=1}^{\infty} \gamma^k r(x_k, \pi(x_k), x_{k+1}) \right\} \right) \quad (14)$$

The expanded Q-function $Q^\pi(x_t, a_t)$ describes the worst case if the action $a_t$ is executed in the state $x_t$ and the strategy $\pi$ is followed thereupon.

The optimization function $Q^\pi(x_t, a_t)$ for $$Q^*(x_t, a_t) := \max_{\pi \in \Pi} Q^\pi(x_t, a_t) \quad (15)$$

is given by the following rule:

$$Q^*(x_t, a_t) = \min_{\substack{x \in X \\ p(x_{t+1} | x_t, a_t) > 0}} \left( r(x_t, a_t, x) + \gamma \cdot \max_{a \in A} Q^*(x, a) \right). \quad (16)$$

A substantial disadvantage of this mode of procedure is that only the worst case is taken into account when finding the strategy. However, this inadequately reflects the requirements of the most varied technical systems.

In "Dynamic Programming and Optimal Control", Athena Scientific, Belmont, Mass., 1995, D.P. Bertsekas formulates access control for a communications network and routing within the communications network as a problem of dynamic programming.

Therefore, the present invention is based on the problem of specifying a method and system for determining a sequence of actions in which the method or sequences of actions achieve an increased flexibility in determining the strategy needed.

In a method for computer-aided determination of a sequence of actions for a system which has states, a transition in state between two states being performed on the basis of an action, the determination of the sequence of actions is performed in such a way that a sequence of states resulting from the sequence of actions is optimized with regard to a prescribed optimization function, the optimization function including a variable parameter with the aid of which it is possible to set a risk which the resulting sequence of states has with respect to a prescribed state of the system.

A system for determining a sequence of actions for a system which has states, a transition in state between two states being performed on the basis of an action, has a processor which is set up in such a way that the determination of the sequence of actions can be performed in such a way that a sequence of states resulting from the sequence of actions is optimized with regard to a prescribed optimization function, the optimization function including a variable parameter with the aid of which it is possible to set a risk which the resulting sequence of states has with respect to a prescribed state of the system.

Thus, the present invention offers a method for determining a sequence of actions at a freely prescribable level of accuracy when finding a strategy for a possible closed-loop control or open-loop control of the system, in general for influencing it. Hence, the embodiments described below are valid both for the method and for the system.

Approximative dynamic programming is used for the purpose of determination, for example a method based on Q-learning or a method based on TD($\lambda$)-learning.

Within Q-learning, the optimization function OFQ is preferably formed in accordance with the following rule:

$$OFQ = Q(x; w^a),$$

x denoting a state in a state space X a denoting an action from an action space A, and $w^a$ denoting the weights of a function approximator which belong to the action a.

The following adaptation step is executed during Q-learning in order to determine the optimum weights $w^a$ of the function approximator:

$$w_{t+1}^{a_t} = w_t^{a_t} + \eta_t \cdot \aleph^\kappa(d_t) \cdot \nabla Q(x_t; w_t^{a_t})$$

with the abbreviation $$d_t = r(x_t, a_t, x_{t+1}) + \gamma \max_{a \in A} Q(x_{t+1}, w_t^a) - Q(x_t, w_t^{a_t})$$

$x_t$, $x_t+1$ respectively denoting a state in the state space X, $a_t$ denoting an action from an action space A, $\gamma$ denoting a prescribable reduction factor, $w_t^{a_t}$ denoting the weighting vector associated with the action $a_t$ before the adaptation step, $w_{t+1}^{a_t}$ denoting the weighing vector associated with the action $a_t$ after the adaptation step, $\eta_t(t=1, \ldots)$ denoting a prescribable step size sequence, $\kappa \in [-1; 1]$ denoting a risk monitoring parameter, $\aleph^\kappa$ denoting a risk monitoring function $\aleph^\kappa(\xi) = (1 - \kappa \text{sign}(\xi))\xi$, $\nabla Q(;)$ denoting the derivation of the function approximator according to its weights, and $r(x_t, a_t, x_{t+1})$ denoting a gain upon the transition of state from the state $x_t$ to the subsequent state $x_{t+1}$.

The optimization function is preferably formed in accordance with the following rule within the TD($\lambda$)-learning method:

OFTD=J(x;w)

x denoting a state in a state space X, a denoting an action from an action space A, and w denoting the weights of a function approximator.

The following adaptation step is executed during TD($\lambda$)-learning in order to determine the optimum weights w of the function approximator:

$$w_{t+1} = w_t + \eta_t \aleph^\kappa(d_t) \cdot z_t$$

with the abbreviations $$d_t = r(w_t, a_t, x_{t+1}) + \gamma J(x_{t+1}; w_t) - J(x_t; w_t),$$

$$z_t = \lambda \cdot \gamma \cdot z_{t-1} + \nabla J(x_t; w_t),$$

$$z_1 = 0$$

$x_t$, $x_{t+1}$ respectively denoting a state in the state space X, $a_t$ denoting an action from an action space A, $\gamma$ denoting a prescribable reduction factor, $w_t$ denoting the weighting vector before the adaptation step, $w_{t+1}$ denoting the weighting vector after the adaptation step, $\eta_t$ (t=1, . . . ) denoting a prescribable step size sequence, $\kappa \in [-1; 1]$ denoting a risk monitoring parameter, $\aleph^\kappa$ denoting a risk monitoring function $\aleph^\kappa(\xi) = (1 - \kappa sign(\xi)) \xi$, $\nabla J(;)$ denoting the derivation of the function approximator according to its weights, and $r(x_t, a_t, x_{t+1})$ denoting a gain upon the transition of state from the state $x_t$ to the subsequent state $x_{t+1}$.

SUMMARY OF THE INVENTION

It is an object of the present invention to provide a technical system and method for determining a sequence of actions using measured values.

It is another object of the present invention to provide a technical system and method that can be subjected to open-loop control or closed-loop control with the use of a determined sequence of actions.

It is a further object of the invention to provide a technical system and method modeled as a Markov Decision Problem.

It is an additional object of the invention to provide a technical system and method that can be used in a traffic management system.

It is yet another object of the invention to provide a technical system and method that can be used in a communications system, such that a sequence of actions is used to carry out access control, routing or path allocation.

It is yet a further object of the invention to provide a technical system and method for a financial market modeled by a Markov Decision Problem, wherein a change in an index of stocks, or a change in a rate of exchange on a foreign exchange market, makes it possible to intervene in the market in accordance with a sequence of determined actions.

These and other objects of the invention will be apparent from a careful review of the following detailed description of the preferred embodiments, which is to read in conjunction with a review of the accompanying drawing figures.

BRIEF DESCRIPTION OF THE DRAWINGS

FIG. 1 shows a flowchart of method steps according to the present invention;

FIG. 2 shows a system modeled as a Markov Decision Problem;

FIG. 3 shows a communications network wherein access control is carried out in a switching unit according to the present invention;

FIG. 4 shows a function approximator for approximative dynamic programming according to the present invention;

FIG. 5 shows a plurality of function approximators for approximative dynamic programming according to the present invention.

DETAILED DESCRIPTION OF THE PREFERRED EMBODIMENTS

Figure 6:
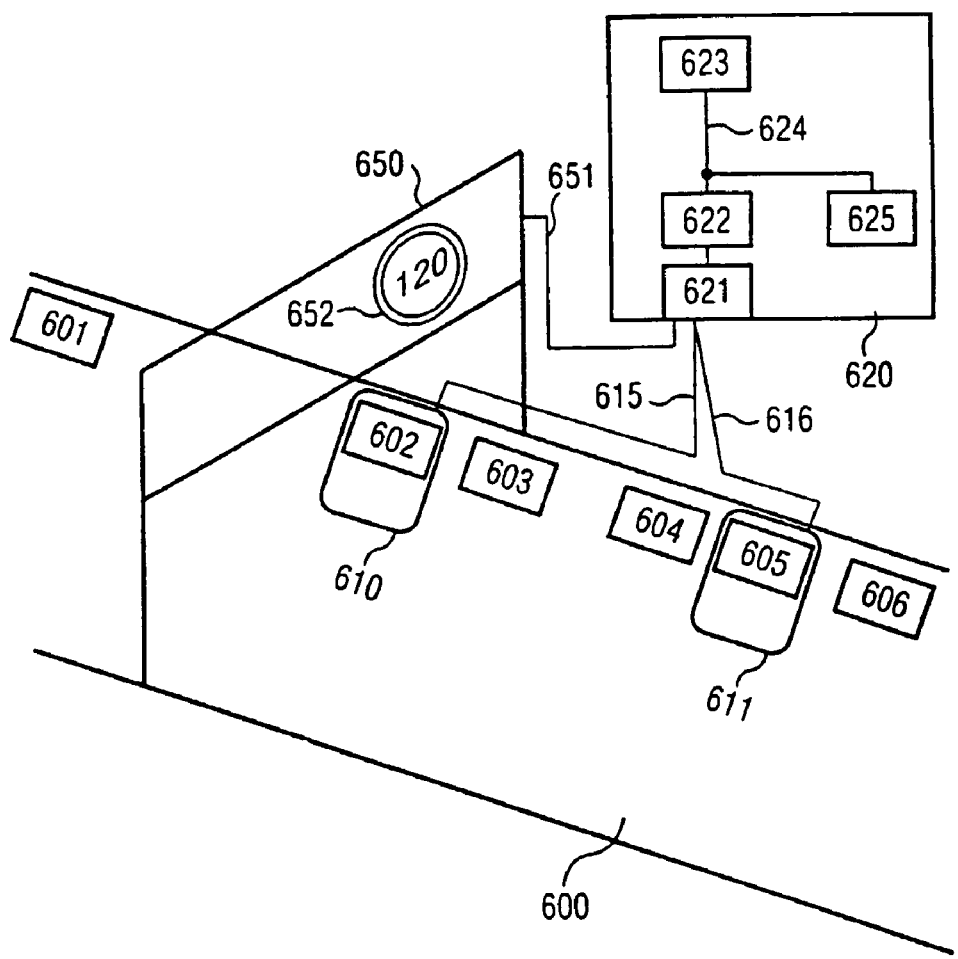
FIG. 6 shows a traffic management system subjected to closed-loop control in accordance with the present invention.

FIG. 1 shows a flowchart according to the present invention, in which individual method steps of a first embodiment are provided, which will be discussed later.

FIG. 2 shows the structure of a typical Markov Decision Problem method.

The system 201 is in a state $x_t$ at an instant t. The state $x_t$ can be observed by an observer of the system. On the basis of an action $a_t$ from a set in the state $x_t$ of possible actions, $a_t \in A(x_t)$, the system makes a transition with a certain probability into a subsequent state $x_t+1$ at a subsequent instant t+1.

As illustrated diagrammatically in FIG. 2 by a loop, an observer 200 perceives 202 observable variables concerning the state $x_t$ and takes a decision via an action 203 with which it acts on the system 201. The system 201 is usually subject to the interference 205.

The observer 200 obtains a gain $r_t$ 204

$$r_t = r(x_t, a_t, x_{t+1}) \in \rho, \quad (1)$$

which is a function of the action $a_t$ 203 and the original state $x_t$ at the instant t as well as of the subsequent state $x_t+1$ of the system at the subsequent instant t+1.

The gain $r_t$ can assume a positive or negative scalar value depending on whether the decision leads, with regard to a prescribable criterion, to a positive or negative system development, to an increase in capital stock or to a loss.

In a further time step, the observer 200 of the system 201 decides on the basis of the observable variables 202, 204 of the subsequent state $x_{t+1}$ in favor of a new action $a_{t+1}$, etc.

A sequence of

State: $x_t \in X$

Action: $a_t \in A(x_t)$

Subsequent state: $x_t + 1 \in X$

Gain $r_t = r(x_t, a_t, x_{t+1}) \in \rho$ describes a trajectory of the system which is evaluated by a performance criterion which accumulates the individual gains $r_t$ over the instants t. It is assumed by way of simplification in a Markov Decision Problem that the state $x_t$ and the action $a_t$ all contain information for the purpose of describing a transition probability $p(x_{t+1}|\cdot)$ of the system from the state $x_t$ to the subsequent state $x_{t+1}$.

In formal terms, this means that:

$$p(x_{t+1}|x_t, K, x_0, a_t, K, a_0) = p(x_{t+1}|x_t, a_t). \quad (2)$$

$p(x_{t+1}|x_t, a_t)$ denotes a transition probability for the subsequent state $x_{t+1}$ for a given state $x_t$ and given action $a_t$.

In a Markov Decision Problem, future states of the system 201 are thus not a function of states and actions which lie further in the past than one time step.

FIG. 3 shows an embodiment of the present invention involving an access control and routing system, such as a communications network 300.

The communications network 300 has a multiplicity of switching units 301a, 301b, . . . , 301i, . . . 301n, which are interconnected via connections 302a, 302b, 302j, ... 302m. A first terminal 303 is connected to a first switching unit 301a. From the first terminal 303, the first switching unit 301a is sent a request message 304 which requests preservation of a prescribed bandwidth within the communications network 300 for the purpose of transmitting data, such as video data or text data.

It is determined in the first switching unit 301a in accordance with a strategy described below, whether the requested bandwidth is available in the communications network 300 on a specified, requested connection instep 305. The request is refused instep 306 if this is not the case. If sufficient bandwidth is available, it is checked in checking step 307 whether the bandwidth can be reserved.

The request is refused in step 308 if this is not the case. Otherwise, the first switching unit 301a selects a route from the first switching unit 301a via further switching units 301i to a second terminal 309 with which the first terminal 303 wishes to communicate, and a connection is initialized in step 310.

The starting point below is a communications network 300 which comprises a set of switching units $$N=\{1, K, n, K, N\} \tag{17}$$

and a set of physical connections $$L=\{1, K, 1, K, L\}, \tag{18}$$

a physical connection l having a capacity of B(l) bandwidth units.

A set $$M=\{1, K, m, K, M\} \tag{19}$$

of different types of service m are available, a type of service m being characterized by a bandwidth requirement b(m), an average connection time $$\frac{1}{V(m)},$$

and a gain c(m) which is obtained whenever a call request of the corresponding type of service m is accepted.

The gain c(m) is given by the amount of money which a network operator of the communications network 300 bills a subscriber for a connection of the type of service. Clearly, the gain c(m) reflects different priorities, which can be prescribed by the network operator and which he associates with different services.

A physical connection 1 can simultaneously provide any desired combination of communications connections as long as the bandwidth used for the communications connections does not exceed the bandwidth available overall for the physical connection.

If a new communications connection of type m is requested between a first node i and a second node j (terminals are also denoted as nodes), the requested communications connection can, as represented above, either be accepted or be refused. If the communications connection is accepted, a route is selected from a set of prescribed routes. This selection is denoted as a routing. b(m) bandwidth units are used in the communications connection of type m for each physical connection along the selected route for the duration of the connection.

Thus, during access control, also referred to as call admission control, a route can be selected within the communications network 300 only when the selected route has sufficient bandwidth available. The aim of the access control and of the routing is to maximize a long term gain which is obtained by acceptance of the requested connections.

At an instant t, the technical system which is the communications network 300 is in a state $x_t$ which is described by a list of routes via existing connections, by means of which lists it is shown how many connections of which type of service are using the respective routes at the instant t.

Events w, by means of which a state $x_t$ could be transferred into a subsequent state $x_{t+1}$, are the arrival of new connection request messages, or else the termination of a connection existing in the communications network 300.

In this embodiment, an action $a_t$ at an instant t, owing to a connection request is the decision as to whether a connection request is to be accepted or refused and, if the connection is accepted, the selection of the route through the communications network 300.

The aim is to determine a sequence of actions, that is to say clearly to determine the learning of a strategy with actions relating to a state $x_t$ in such a way that the following rule is maximized:

$$E\left\{\sum_{k=0}^{\infty} e^{-\beta t_k} \cdot g(x_{t_k}, \omega_k, a_{t_k})\right\}, \tag{20}$$

E{.} denoting an expectation, $t_k$ denoting an instant at which a kth event takes place, $g(x_{tk}, \omega_k, a_{tk})$. denoting the gain which is associated with the kth event, and β denoting a reduction factor which evaluates an immediate gain as being more valuable than a gain at instants lying further in the future.

Different implementations of a strategy lead normally to different overall gains

G:

$$G = \sum_{k=0}^{\infty} e^{-\beta t_k} \cdot g(x_{t_k}, \omega_k, a_{t_k}). \tag{21}$$

The aim is to maximize the expectation of the overall gain G in accordance with the following rule J:

$$J = E\left\{\sum_{k=0}^{\infty} e^{-\beta t_k} \cdot g(x_{t_k}, \omega_k, a_{t_k})\right\}, \tag{22}$$

it being possible to set a risk which reduces the overall gain G of a specific implementation of access control and of a routing strategy to below the expectation.

The TD(λ)-learning method is used to carry out the access control and the routing.

The following target function is used in this embodiment:

$$J^*(x_t) = E_\tau\{e^{-\beta\tau}\}E_\omega\left\{\max_{a\in A}[g(x_t, \omega_t, a) + J^*(x_{t+1})]\right\}, \quad (23)$$

A denoting an action space with a prescribed number of actions which are respectively available in a state $x_t$, $\tau$ denoting a first instant at which a first event $\omega$ occurs, and $x_{t+1}$ denoting a subsequent state of the system.

An approximated value of the target value $J^*(x_t)$ is learned and stored by employing a function approximator 400 (compare FIG. 4) with the use of training data.

Training data are data previously measured in the communications network 300 and relating to the behavior of the communications network 300 in the case of incoming connection requests 304 and of termination of messages. This time sequence of states is stored, and these training data are used to train the function approximator 400 in accordance with the learning method described below.

A number of connections of in each case one type of service m on a route of the communications network 300 serve in each case as input variable of the function approximator 400 for each input 401, 402, 403 of the function approximator 400. These are represented in FIG. 4 by blocks 404, 405, 406. An approximated target value $\tilde{J}$ of the target value $J^*$ is the output variable of the function approximator 400.

FIG. 5 shows a detailed representation of a function approximator 500, which has several component function approximators 510, 520.

One output variable is the approximated target value $\tilde{J}$, which is formed in accordance with the following rule:

$$\tilde{J}(x_t, \Theta) = \sum_{l=1}^{L} \tilde{J}^{(l)}(x_t^{(l)}, \Theta_t^{(l)}). \quad (24)$$

The input variables of the component function approximators 510, 520, which are present at the inputs 511, 512, 513 of the first component function approximator 510, or at the inputs 521, 522 and 523 of the second component function approximator 520 are, in turn, respectively a number of types of service of a type m in a physical connection r in each case, symbolized by blocks 514, 515, 516 for the first component function approximator, and 524, 525 and 526 for the second component function approximator 520.

Component output variables 530, 531, 532, 533 are fed to an adder unit 540, and the approximated target variable $\tilde{J}$ is formed as output variable of the adder unit.

Let it be assumed that the communications network 300 is in the state $x_{t_k}$ and that a request message with which a type of service m of class m is requested for a connection between two nodes i, j reaches the first switching unit 301a.

A list of permitted routes between the nodes i and j is denoted by R(i, j), and a list of all possible routes is denoted by $$\tilde{R}(i, j, x_{t_k}) \subset R(i, j) \quad (25)$$

as a subset of the routes R(i, j) which could implement a possible connection with regard to the available and requested bandwidth.

For each possible route r, $r\in\tilde{R}(i,j,x_{t_k})$, a subsequent state $x_{t_k}+1(x_{t_k}, \omega_k, r)$ is determined which results from the fact that the connection request 304 is accepted and the connection on the route r is made available to the requesting first terminal 303.

This is illustrated in FIG. 1 as step 102, the state of the system and the respective event being respectively determined in step 101. A route $r^*$ to be selected is determined in step 103 in accordance with the following rule:

$$r^* = \arg_{r\in\tilde{R}(i,j,x_{t_k})}\max \tilde{J}(x_{t_k}+1(x_{t_k}, \omega_k, r), \Theta_t). \quad (26)$$

A check is made in step 104 as to whether the following rule is fulfilled:

$$c(m) + \tilde{J}(x_{t_k}+1(x_{t_k}, \omega_k, r^*), \Theta_t) < \tilde{J}(x_{t_k}, \Theta_t). \quad (27)$$

If this is the case, the connection request 304 is rejected in step 105, otherwise the connection is accepted and "switched through" to the node j along the selected route $r^*$ in step 106.

Weights of the function approximator 400, 500 which are adapted in the TD($\lambda$)-learning method to the training data, are stored in a parameter vector $\Theta$ for an instant t in each case, such that an optimized access control and an optimized routing are achieved.

During the training phase, the weighting parameters are adapted to the training data applied to the function approximator.

A risk parameter $\kappa$ is defined with the aid of which a desired risk, which the system has with regard to a prescribed state owing to a sequence of actions and states, can be set in accordance with the following rules:

$-1 \leq \kappa < 0$: risky learning, $\kappa = 0$: neutral learning with regard to the risk, $0 < \kappa < 1$: risk-avoiding learning, $\kappa = 1$: worst-case learning.

Furthermore, a prescribable parameter $0 \leq \lambda \leq 1$ and a step size sequence $\gamma k$ are prescribed in the learning method.

The weighting values of the weighting vector $\Theta$ are adapted to the training data on the basis of each event $\omega_{tk}$ in accordance with the following adaptation rule:

$$\Theta_k = \Theta_{k-1} = \gamma k^{\eta\kappa}(d_k)z_t, \quad (28)$$

in which case $$d_k = e^{-\beta(t_k - t_{k-1})}(g(x_{t_k}, \omega_k, a_{t_k}) + \tilde{J}(x_{t_k}, \Theta_{k-1})) - \tilde{J}(x_{t_{k-1}}, \Theta_{k-1}) \quad (29)$$

$$z_t = \lambda e^{-\beta(t_{k-1} - t_{k-2})}z_{t-1} + \nabla\Theta\tilde{J}(x_{t_{k-1}}, \Theta_{k-1}), \quad (30)$$

and $$\aleph^\kappa(\xi) = (1 - \kappa\,\text{sign}(\xi))\xi. \quad (31)$$

It is assumed that: $z_1 = 0$.

The function $$g(x_{t_k}, \omega_k, a_{t_k}) \quad (32)$$

denotes the immediate gain in accordance with the following rule:

$$g(x_{t_k}, \omega_k, a_{t_k}) = \begin{cases} c(m) & \text{when } \omega_{t_k} \text{ is a service request for a type of} \\ & \text{service } m, \text{ and the connection is accepted} \\ 0 & \text{otherwise} \end{cases} \quad (33)$$

Thus, as described above, a sequence of actions is determined with regard to a connection request such that a connection request is either rejected or accepted on the basis of an action. The determination is performed taking account of an optimization function in which the risk can be set by means of a risk control parameter $\kappa \in [-1; 1]$ in a variable fashion.

FIG. 6 shows an embodiment of the present invention in relation to a traffic management system A road 600 on which automobiles 601, 602, 603, 604, 605 and 606 are being driven. Conductor loops 610, 611 integrated into the road 600 receive electric signals in a known way and feed the electric signals 615, 616 to a computer 620 via an input/output interface 621. In an analog-to-digital converter 622 connected to the input/output interface 621, the electric signals are digitized into a time series and stored in a memory 623, which is connected by a bus 624 to the analog-to-digital converter 622 and a processor 625. Via the input/output interface 621, a traffic management system 650 is fed control signals 651 from which it is possible to set a prescribed speed stipulation 652 in the traffic management system 650, or else further particulars of traffic regulations, which are displayed via the traffic management system 650 to drivers of the vehicles 601, 602, 603, 604, 605 and 606.

The following local state variables are used in this case for the purpose of traffic modeling:

traffic flow rate v, vehicle density p (p= number of vehicles per kilometer $$\frac{Fz}{km}$$

traffic flow q (q= number of vehicles per hour $$\frac{Fz}{h},$$

(q=v*p)), and speed restrictions 652 displayed by the traffic management system 650 at an instant in each case.

The local state variables are measured as described above by using the conductor loops 610, 611.

These variables (v(t), p(t), q(t)) therefore represent a state of the technical system of "traffic" at a specific instant t.

In this embodiment, the system is therefore a traffic system which is controlled by using the traffic management system 650, and an extended Q-learning method is described as method of approximative dynamic programming.

The state $x_t$ is described by a state vector $$x(t)=(v(t), p(t), q(t)) \quad (34)$$

The action $a_t$ denotes the speed restriction 652, which is displayed at the instant t by the traffic management system 650. The gain $r(x_t, a_t, x_{t+1})$ describes the quality of the traffic flow which was measured between the instants t and t+1 by the conductor loops 610 and 611.

In this embodiment, $r(x_t, a_t, x_{t+1})$ denotes the average speed of the vehicles in the time interval [t, t+1]

or the number of vehicles which have passed the conductor loops 610 and 611 in the time interval [t, t+1]

or the variance of the vehicle speeds in the time interval [t, t+1], or a weighted sum from the above variables.

A value of the optimization function OFQ is determined for each possible action $a_t$, that is to say for each speed restriction which can be displayed by the traffic management system 650, an estimated value of the optimization function OFQ being realized in each case as a neural network.

This results in a set of evaluation variables for the various actions $a_t$ in the system state $x_t$. Those actions $a_t$ for which the maximum evaluation variable OFQ has been determined in the current system state $x_t$ are selected in a control phase from the possible actions $a_t$, that is to say from the set of the speed restrictions which can be displayed by the traffic management system 650.

In accordance with this embodiment, the adaptation rule, known from the Q-learning method, for calculating the optimization function OFQ is extended by a risk control function $\aleph^\kappa(.)$, which takes account of the risk.

In turn, the risk control parameter $\kappa$ is prescribed in accordance with the strategy from the first exemplary embodiment in the interval of $[-1 \leq \kappa \leq 1]$, and represents the risk which a user wishes to run in the application with regard to the control strategy to be determined.

The following evaluation function OFQ is used in accordance with this exemplary embodiment:

$$OFQ=Q(x; w^a), \quad (35)$$

x=(v; p; q) denoting a state of the traffic system, a denoting a speed restriction from the action space A of all speed restrictions which can be displayed by the traffic management system 650, and $w^a$ denoting the weights of the neural network which belong to the speed restriction a.

The following adaptation step is executed in Q-learning in order to determine the optimum weights $w^a$ of the neural network:

$$w_{t+1}^{a_t} = w_t^{a_t} + \eta_t \cdot \aleph^\kappa(d_t) \cdot \nabla Q(x_t; w_t^{a_t}) \quad (36)$$

using the abbreviation:

$$d_t = r(x_t, a_t, x_{t+1}) + \gamma \max_{a \in A} Q(x_{t+1}, w_t^a) - Q(x_t, w_t^{a_t}) \quad (37)$$

$x_t, x_{t+1}$ denoting in each case a state of the traffic system in accordance with rule (34), $a_t$ denoting an action, that is to say a speed restriction which can be displayed by the traffic management system 650, $\gamma$ denoting a prescribable reduction factor, $w_t^{a_t}$ denoting the weighting vector belonging to the action $a_t$, before the adaptation step, $w_{t+1}^{a_t}$ denoting the weighting vector belonging to the action $a_t$, after the adaptation step, $\eta_t(t=1, \ldots)$ denoting a prescribable step size sequence, $\kappa \in [-1; 1]$ denoting a risk control parameter, $\aleph^\kappa$ denoting a risk control function $\aleph^\kappa(\xi)=(1-\kappa \text{sign}(\xi))\xi$, $\nabla_Q(;)$ denoting the derivative of the neural network with respect to its weights, and $r(x_t, a_t, x_{t+1})$ denoting a gain upon the transition in state from the state $x_t$ to the subsequent state $x_{t+1}$.

An action $a_t$ can be selected at random from the possible actions $a_t$ during learning. It is not necessary in this case to select the action $a_t$ which has led to the largest evaluation variable.

The adaptation of the weights has to be performed in such a way that not only is a traffic control achieved which is optimized in terms of the expectation of the optimization function, but that also account is taken of a variance of the control results.

This is particularly advantageous since the state vector x(t) models the actual system of traffic only inadequately in some aspects, and so unexpected disturbances can thereby occur. Thus, the dynamics of the traffic, and therefore of its modeling, depend on further factors such as weather, proportion of trucks on the road, proportion of mobile homes, etc., which are not always integrated in the measured variables of the state vector x(t). In addition, it is not always ensured that the road users immediately implement the new speed instructions in accordance with the traffic management system.

A control phase on the real system in accordance with the traffic management system takes place in accordance with the following steps:

1. The state $x_t$ is measured at the instant t at various points in the traffic system of traffic and yields a state vector $$x(t):=(v(t), p(t), q(t)).$$

2. A value of the optimization function is determined for all possible actions $a_t$, and that action $a_t$ with the highest evaluation in the optimization function is selected.

Although modifications and changes may be suggested by those skilled in the art to which this invention pertains, it is the intention of the inventors to embody within the patent warranted hereon all changes and modifications that may reasonably and properly come under the scope of their contribution to the art.

The invention claimed is:

1. A method for computer-aided determination of a sequence of actions for a system having states, the method comprising the steps of:
   performing a transition in state between two states on the basis of an action;
   determining the sequence of actions to be performed such that a sequence of states results from the sequence of actions;
   optimizing the sequence of states with regard to a prescribed optimization function, including a variable parameter; and
   using the variable parameter to set a risk which the resulting sequence of states has with respect to a prescribed state of the system.

2. The method as claimed in claim 1, further comprising the step of:
   using approximative dynamic programming for the purpose of determination.

3. The method as claimed in claim 2, further comprising the step of:
   basing the approximative dynamic programming on Q-learning.

4. The method as claimed in claim 3, further comprising the steps of:
   forming an optimization function with Q-learning in accordance with the following rule:

$OFQ=Q(x; w^a)$, and adapting weights of the function approximator in accordance with the following rule:

$w_{t+1}^{a_t}=w_t^{a_t}+\eta_t \cdot \aleph^\kappa(d_t) \cdot \nabla Q(x_t; w_t^{a_t})$ wherein $$d_t = r(x_t, a_t, x_{t+1}) + \gamma \max_{a \in A} Q(x_{t+1}, w_t^{a_t'}) - Q(x_t, w_t^{a_t}).$$

5. The method as claimed in claim 2, further comprising the step of:
   basing the approximative dynamic programming on TD($\lambda$)-learning.

6. The method as claimed in claim 5, further comprising the steps of:
   forming the optimization function within TD($\lambda$)-learning in accordance with the following rule:

$OFTD=J(x; w);$ and
   adapting weights of the function approximator are adapted in accordance with the following rule:

$w_{t+1}=w_t+\eta_t \cdot \aleph^\kappa(d_t) \cdot z_t,$ wherein $d_t=r(w_t, a_t, x_{t+1})+\gamma J(x_t+1; w_t), z_t=\lambda \cdot \gamma \cdot z_{t-1} \nabla J(x_t; w_t),$
   and $z_{-1}=0.$ 7. The method as claimed in claim 6, further comprising the step of:
   using a technical system to determine the sequence of actions before the determination measured values are measured.

8. The method as claimed in claim 7, further comprising the step of:
   subjecting the technical system to open-loop control in accordance with the sequence of actions.

9. The method as claimed in claim 7, further comprising the step of:
   subjecting the technical system to closed-loop control in accordance with the sequence of actions.

10. The method as claimed in claim 9, further comprising the step of:
    modeling the system as a Markov Decision Problem.

11. The method as claimed in claim 10, further comprising the step of:
    using the system in a traffic management system.

12. The method as claimed in claim 10, further comprising the step of:
    using the system in a communications system.

13. The method as claimed in claim 10, further comprising the step of:
    using the system to carry out access control in a communications network.

14. The method as claimed in claim 10, further comprising the step of:
   using the system to carry out routing in a communications network.

15. A system for determining a sequence of actions for a system having states, wherein a transition in state between two states is performed on the basis of an action, the system comprising:
   a processor for determining a sequence of actions, whereby a sequence of states resulting from the sequence of actions is optimized with regard to a prescribed optimization function, and the optimization function includes a variable parameter for setting a risk which the resulting sequence of states has with respect to a prescribed state of the system.

16. The system as claimed in claim 15, wherein the processor is used to subject a technical system to open-loop control.

17. The system as claimed in claim 15, wherein the processor is used to subject a technical system to closed-loop control.

18. The system as claimed in claim 15, wherein the processor is used in a traffic management system.

19. The system as claimed in claim 15, wherein the processor is used in a communication system.

20. The system as claimed in claim 15, wherein the processor is used to carry out access control in a communications network.

21. The system as claimed in claim 15, wherein the processor is used to carry out routing in a communications network.

* * * * *